(12) United States Patent
Siva et al.

(10) Patent No.: US 11,736,596 B1
(45) Date of Patent: *Aug. 22, 2023

(54) OPTICAL MODULE FOR CXL STANDARD

(71) Applicant: Marvell Asia Pte Ltd., Singapore (SG)

(72) Inventors: Kumaran David Siva, Palo Alto, CA (US); Arash Farhoodfar, Sunnyvale, CA (US); Radhakrishnan L. Nagarajan, San Jose, CA (US)

(73) Assignee: Marvell Asia Pte Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,433

(22) Filed: Jul. 1, 2022

Related U.S. Application Data

(63) Continuation of application No. 16/777,655, filed on Jan. 30, 2020, now Pat. No. 11,388,268.

(51) Int. Cl.
*G06F 13/12* (2006.01)
*G06F 13/38* (2006.01)
(Continued)

(52) U.S. Cl.
CPC ............ *H04L 69/18* (2013.01); *G06F 13/128* (2013.01); *G06F 13/387* (2013.01); *H04B 10/278* (2013.01); *H04B 10/801* (2013.01); *H04L 1/0001* (2013.01); *H04L 1/004* (2013.01); *H04L 69/10* (2013.01); *H04L 69/12* (2013.01);
(Continued)

(58) Field of Classification Search
CPC .... G06F 13/10–4295; G06F 2213/0002–4004; H04B 10/03–90; H04J 14/002–086; H04J 2203/0001–0098; H04L 1/0001–248; H04L 12/40–437; H04L 2012/40208–40293; H04L 27/0002–389; H04L 2027/0016–0097; H04L 69/02–40; H04Q 11/0001–08; H04Q 2011/0007–0098; H04Q 2213/038; H04Q 2213/13038

See application file for complete search history.

(56) References Cited

U.S. PATENT DOCUMENTS 11,388,268 B1 * 7/2022 Siva ..................... H04L 69/18
2009/0279889 A1 * 11/2009 Kirkpatrick ...... H04B 10/25752
(Continued)

OTHER PUBLICATIONS

Das Sharma, Introduction to Compute Express Link, Mar. 2019, White Paper (Year: 2019).
U.S. Appl. No. 16/777,655, filed Jan. 30, 2020, Siva et al.

*Primary Examiner* — Timothy J Weidner

(57) ABSTRACT

An optical module includes first circuitry configured to receive data transmitted from a host over an electrical communication link at a first data rate, the data transmitted from the host being either one of PCIe data and CXL data and change a data rate for transmission of data from the optical module, the data transmitted from the optical module being transmitted at a second data rate different from the first data rate. Second circuitry is configured to convert the data transmitted from the host at the first data rate from an electrical format to an optical format for transmission from the optical module at the second data rate and convert data received from an optical receiver at the second data rate from the optical format to the electrical format for transmission from the optical module to the host at the first data rate via the first circuitry.

22 Claims, 9 Drawing Sheets

(51) Int. Cl.
*H04B 10/278* (2013.01)
*H04B 10/80* (2013.01)
*H04L 1/00* (2006.01)
*H04L 69/10* (2022.01)
*H04L 69/12* (2022.01)
*H04L 69/16* (2022.01)
*H04L 69/18* (2022.01)

(52) U.S. Cl.
CPC ...... *H04L 69/16* (2013.01); *G06F 2213/0008* (2013.01); *G06F 2213/0026* (2013.01)

(56) References Cited

U.S. PATENT DOCUMENTS

| | | | |
|---|---|---|---|
| 2011/0116795 A1* | 5/2011 | Park | H04B 10/801 |
| 2014/0169789 A1* | 6/2014 | Bhoja | H04B 10/40 |
| 2020/0226018 A1 | 7/2020 | Das Sharma | |

* cited by examiner

OPTICAL MODULE FOR CXL STANDARD

CROSS-REFERENCES TO RELATED APPLICATIONS

The present disclosure is a continuation of U.S. patent application Ser. No. 16/777,655, filed on Jan. 30, 2020. The entire disclosure of the application referenced above is incorporated herein by reference.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to network systems and methods.

Over the last few decades, the use of communication networks has exploded. In the early days of the Internet, popular applications were limited to emails, bulletin board, and mostly informational and text-based web page surfing, and the amount of data transferred was relatively small. Today, the Internet and mobile applications demand a huge amount of bandwidth for transferring photo, video, music, and other multimedia files. Communication networks are also important in computational applications, such as artificial intelligence and deep learning, wherein computational tasks are performed by more than one processing entities. For example, multiple computing entities (e.g., central processing units) and devices (e.g., memory, storage, etc.) can be interconnected to form a computing network cluster, which a large amount of computation and data processing is shared among the these entities and devices.

For a long time, for short range and very short range communication, peripheral component interconnect express (PCIe) standard has been widely used. PCIe offers high bandwidth suitable for CPU-to-device and CPU-memory connections. In 2019, a consortium of technology companies formed compute express link (CXL) standard that builds upon the PCIe physical and electrical interface, with additional protocol in I/O, memory, and cache coherence. While many companies joined the CXL 1.0 specification that was published in March 2019, the standard is still evolving. It is to be appreciated that embodiments of the present invention build provide additional functionalities for the CXL standard, as described below.

BRIEF SUMMARY OF THE INVENTION

The present invention is directed to network systems and methods. More specifically, embodiments of the present invention provide a network apparatus that includes a central processing unit that is includes both PCIe and CXL blocks for data transfer. The network apparatus includes a communication link that is configured to transfer data in PAM format at high speed and low latency. The apparatus additional includes a retimer or a gearbox for adjusting data transfer rate. Various components, such as memory and processing devices, can be connected to the central processing unit via the communication link. There are other embodiments as well.

According to an embodiment, the present invention provides a computer server apparatus, which includes a central processing unit that has a PCIe block and a CXL block. The apparatus also includes a high-speed communication link, which is configured in a PAM4 modulation format and a high gain of greater than a 3 dB coding gain and less than 20 dB and a low latency FEC of about 20 to 300 nanoseconds. The high-speed communication link is coupled to the central processor unit. The apparatus further includes a retimer device coupled to the high-speed communication link. The apparatus also includes a plurality of processing devices coupled to the high-speed communication link to communicate to the central processing unit. The apparatus further includes a plurality of memory devices coupled to the high-speed communication link. The apparatus additionally includes a network interface device coupled to the high-speed communication link.

According to another embodiment, the present invention provides a semiconductor integrated circuit device, which includes a semiconductor substrate. The device also includes a plurality of transmit devices. The device further includes a plurality of receive devices. The device also includes a bus device that includes a transmit device and a receive device. The bus device is coupled to a management device and an FEC device. The device also includes a switch device configured between each of the plurality of transmit devices and each of the receive devices.

According to yet another embodiment, the present invention provides a server apparatus, which includes an optical ring device. The apparatus also includes a plurality of processing devices coupled to the optical ring device. Each of the processing devices is coupled to a silicon photonics device. The silicon photonics device is coupled to the optical ring device. The apparatus also includes a plurality of memory devices coupled to the optical ring device. Each of the memory devices is coupled to the silicon photonics device. The plurality of memory devices is coupled to the optical ring device.

According to yet another embodiment, the present invention provides a computer server apparatus, which includes a central processing unit device comprising a PCIe block and a CXL block. The apparatus further includes an optical communication link, which is configured in a PAM4 modulation format. The apparatus also includes a plurality of processing devices coupled to the optical communication link to communicate to the central processing unit device. Each of the processing devices is coupled to a silicon photonics device coupled to the optical communication link. The apparatus further includes a plurality of memory devices coupled to the optical communication link. Each of the memory devices is coupled to a silicon photonics device coupled to the optical communication link.

It is to be appreciated that embodiments of the present invention provide many advantages over conventional techniques. Among other things, by providing high-speed optical communication with low latency, embodiments of the present invention allow two or more computing clusters to be interconnected to share computational resources and work together. For example, embodiments of the present invention are implemented in compliance with CXL and PCIe standards, where both NRZ and PAM4 encoding schemes are used. Depending on the bandwidth and latency requirements, network devices and systems can switch between different communication modes, providing flexibility and modularity.

Embodiments of the present invention can be implemented in conjunction with existing systems and processes. For example, network devices and components according to the present invention can be manufactured using existing manufacturing equipment and techniques. In various implementations, systems and devices according to the present invention are compatible with existing protocols and standards (e.g., PAM4, NRZ, PCIe, CXL, etc.). There are other benefits as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
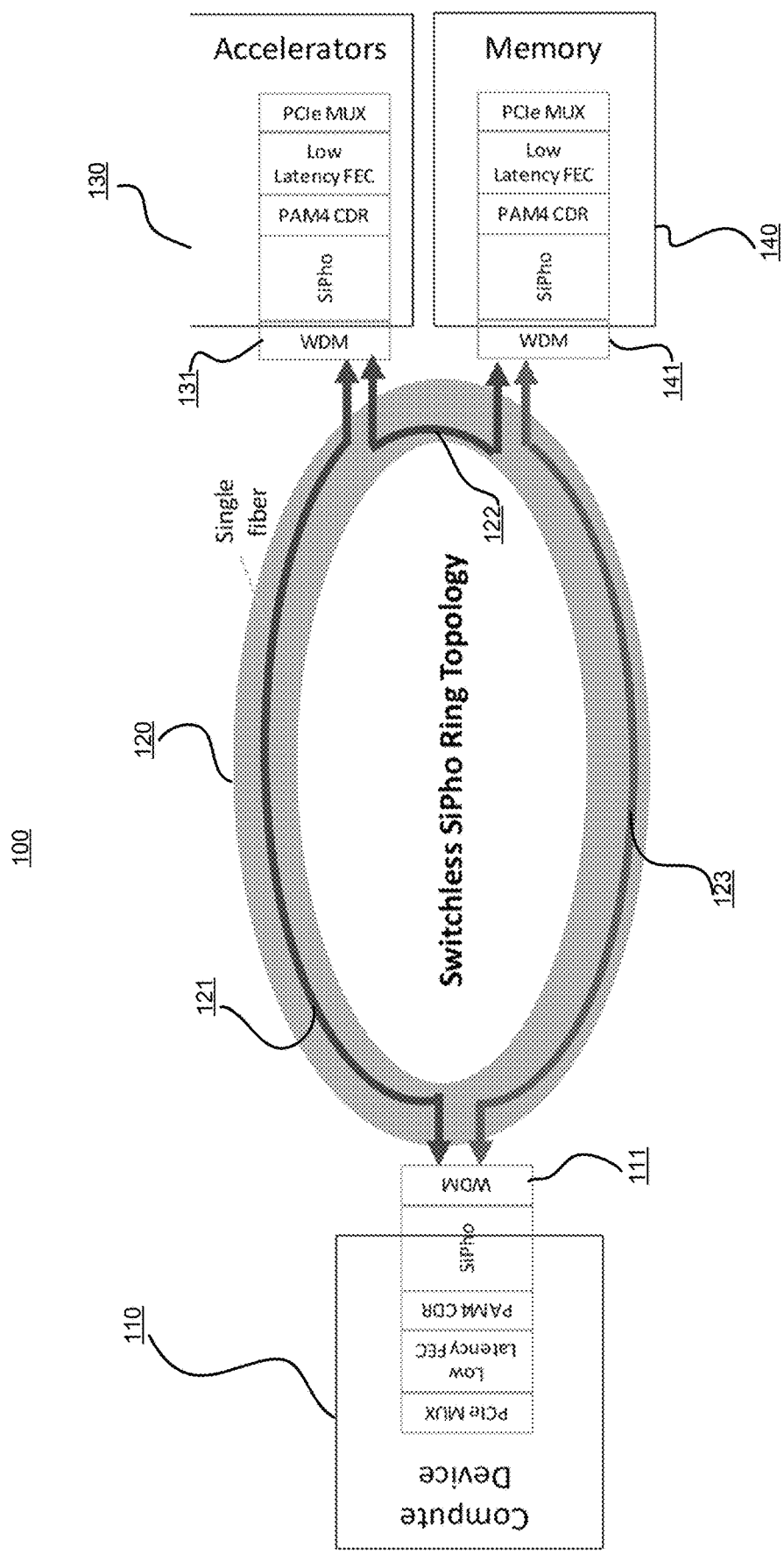
FIG. 1 is a simplified diagram illustrating a system with a switchless topology according to embodiments of the present invention.

The present invention is directed to network systems and methods. More specifically, embodiments of the present invention provide a network apparatus that includes a central processing unit that is includes both PCIe and CXL blocks for data transfer. The network apparatus includes a communication link that is configured to transfer data in PAM format at high speed and low latency. The apparatus additional includes a retimer or a gearbox for adjusting data transfer rate. Various components, such as memory and processing devices, can be connected to the central processing unit via the communication link. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating a system with a switchless topology according to embodiments of the present invention. This diagram is merely an example, which should not unduly limit the scope of the claims. One of ordinary skill in the art would recognize many variations, alternatives, and modifications. The compute express link (CXL) standard is suitable for very high speed and high bandwidth communication, which is important in applications such as distributed computing. As an example, FIG. 1 illustrates a ring topology 100. For the purpose of illustration, the ring topology 100 includes three entities, which are compute device 110, accelerators 130, and memory 140 as shown. The communication channel 120 includes optical links 121, 122, and 123. For example, each of these optical links includes a single optical fiber, and they directly connect the three entities with one another. As shown, optical link 121 directly connects entities 100 and 130; optical link 122 directly connects entities 130 and 140; and optical link 123 directly connects entities 110 and 130.

Each of the three entities in FIG. 1 includes an optical communication interface for transmitting and receiving data over communication channel 120. For example, compute device 100 includes, as shown, a PCIe multiplexer (MUX), a low-latency forward error correction (FEC) module, a PAM4 clock data recovery (CDR) module, a silicon photonic (SiPho) module, and a wavelength division multiplexing (WDM) interface 111. It is to be appreciated that while PAM4 format is described here as an example, other PAM formats (e.g., PAM8, PAM16, etc.) may be used as well. The accelerator 130 and memory 140 similarly include these communication components for transmitting data over these the communication channel 120. It is to be appreciated that the SiPho module and WDM interface allow for switchless communication, where data can transmit over communication channel 120 without using switches on communication channel 120. By performing wavelength multiplexing, communication channel 120 can efficiently provide point-to-point connections without relying on conventional cable connections. For example, CXL/PCIe data from each of three entities originate directly from the entities themselves, and the respective SiPho modules modulate these data into optical signal. In various embodiments, power management of SiPho modules is dynamically provided to ensure a high level of efficiency.

Figure 2:
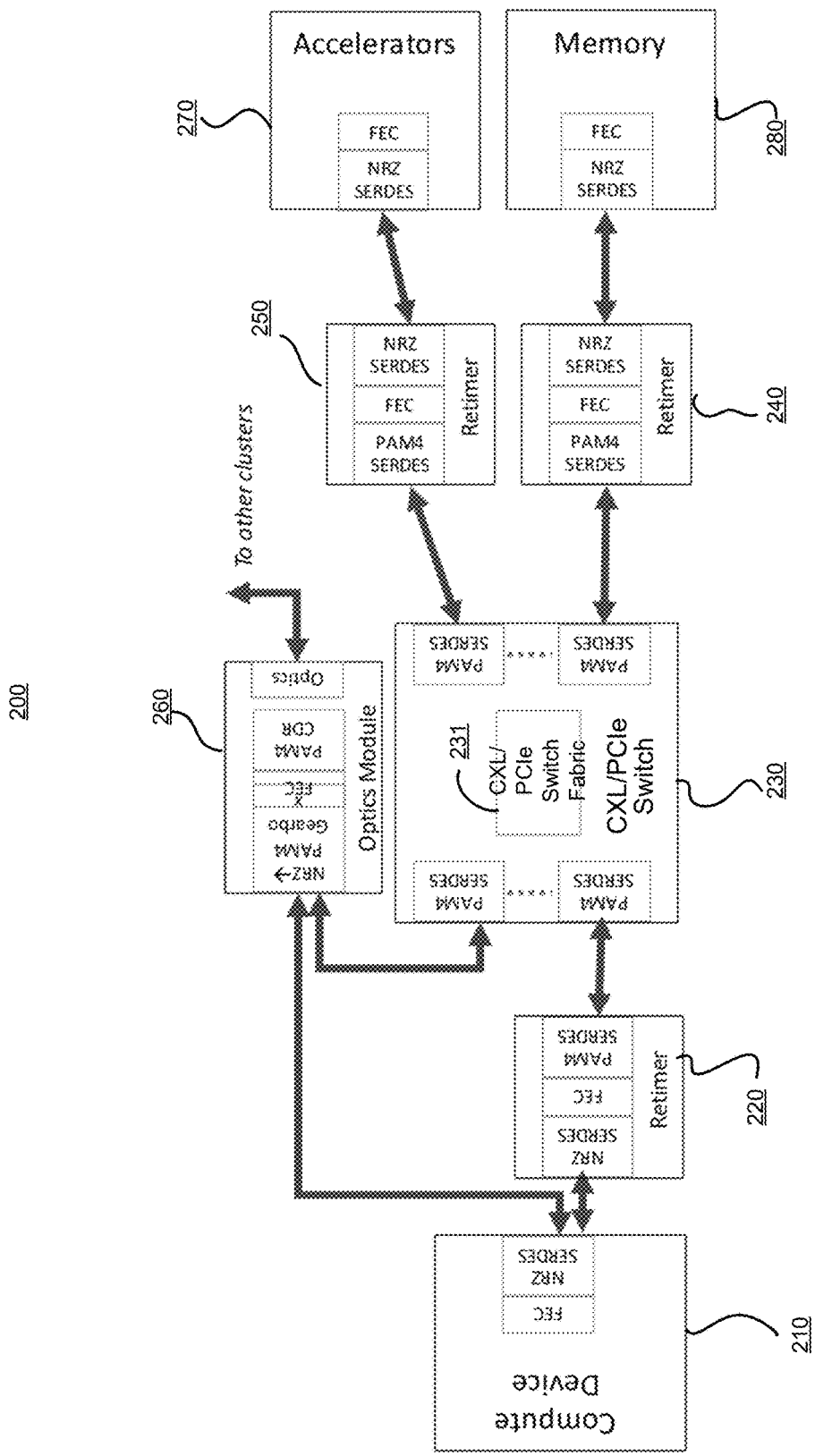
FIG. 2 is a simplified diagram illustrating a switching topology with optical connectivity according to embodiments of the present invention.

FIG. 2 is a simplified diagram illustrating a switching topology with optical connectivity according to embodiments of the present invention. This diagram is merely an example, which should not unduly limit the scope of the claims. One of ordinary skill in the art would recognize many variations, alternatives, and modifications. In an illustrative topology 200 as shown, the entities within the topology are optically and/or electrically connected to each other for data transmission. For example, non-return to zero (NRZ) based communication links are multiplexed under PCIe multiplexing regime, and optical communication is multiplexed under PAM4 regime. In various embodiments, switching topology 200 in FIG. 2 is implemented as a cluster of entities configured to perform artificial intelligence (AI) computations, which generally requires high data throughput. For example, compute device 210 communicates with accelerators 270 (which speeds up the AI computation process) and memory 280 within switching topology 200, and together these three entities perform as a functional cluster. They are interconnected to one another via retimers (blocks 220, 240, and 250) and switch 230. For example, retimers (i.e., blocks 220, 240, and 250) are mixed signal (analog and digital) devices that are protocol-aware and have the ability to fully recover the data, to extract the embedded clock, and to retransmit fresh copies of the data using a clean clock. The fresh copies of the data are generated by the retimers are suitable for the intended applications that require low latency and high transmission speed.

For the purpose of illustration, only the communication portion of the entities 210, 270, and 280 are shown. Compute device 210 includes an FEC module for encoding and an NRZ SerDes for generating NRZ data, and it communicates with retimer 220 using NRZ protocol. For example, the communication link between compute device 210 and retimer 220 comprises an electrical connection. Retimer 220 includes an NRZ SerDes for processing NRZ signals, and FEC module for FEC encoding, and a PAM4 SerDes for generating PAM4 data that are to be transmitted to switch 230. In various embodiments, the FEC module performs at low latency to enable low-latency (e.g., 20 to 300 nanoseconds in a specific implementation, and less than 40 nanoseconds in certain implementations) connectivity. Retimers 240 and 250 respectively perform similar functions for memory 280 and accelerators 270. Retimers 230, 240, and 250 are all connected to switch 230. For example, retimers generate fresh copies of data at higher rate (than the data rates at which they were received) and transmit the higher rate data to switch 230. Switch 230 performs CXL/PCIe multiplexing and transmits multiplexed data to optical module 260. For example, the CXL/PCIe multiplexing process takes data received from retimer and transmits them at a high data rate (e.g., the higher data rates provided by the retimer). Switch 230 includes a CXL/PCIe switch fabric through which various network nodes are interconnected. The higher rate data are processed by optics module 260, which is connected to other computational (e.g., AI) clusters. Optics module 260 is implemented at a high data rate (e.g., 16 Gbs or higher) and low latency. Optics module 260 includes a gearbox that converts NRZ data (low data rate) to PAM4 data (high data rate). Optics module 260 additionally includes FEC module for FEC encoding. In an implementation, the FEC module includes a soft FEC encoding scheme that makes use of parity bits to provide a coding gain of about 1.3 dB, and this soft FEC technique is described in U.S. patent application Ser. No. 15/691,023, entitled "SOFT FEC WITH PARITY CHECK", filed Aug. 30, 2017, which is incorporated by reference herein. Optic module 260 additionally includes PAM4 CDR for clock recovery. Optic module 260 includes optics for transmitting and receiving optical signals.

Figure 3:
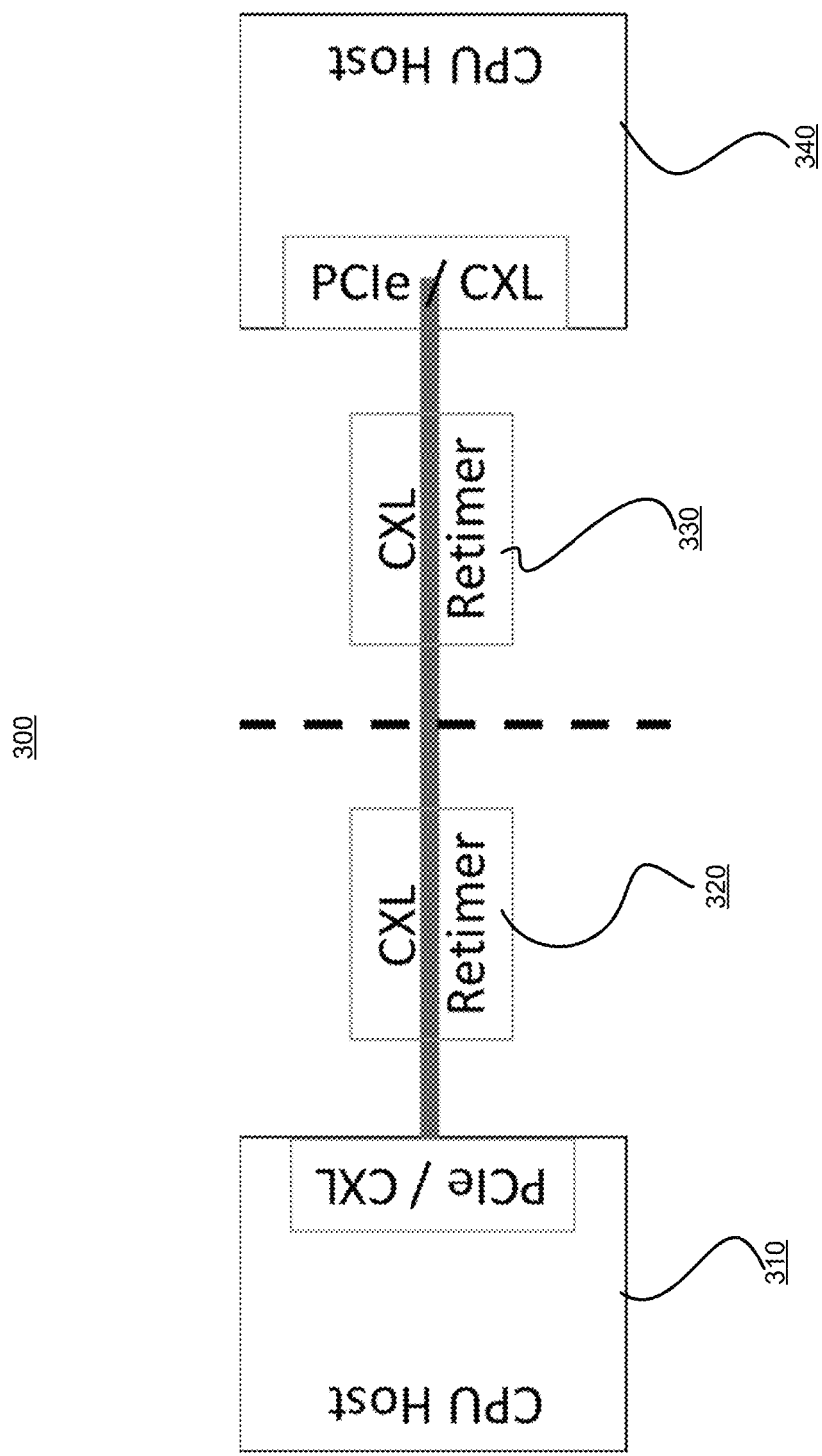
FIG. 3 is a simplified diagram illustrating communication configuration with direct connection between retimers according to embodiments of the present invention.

FIG. 3 is a simplified diagram illustrating communication configuration with direct connection between retimers according to embodiments of the present invention. This diagram is merely an example, which should not unduly limit the scope of the claims. One of ordinary skill in the art would recognize many variations, alternatives, and modifications. CPU host 310 is connected to CXL retimer 320, which adjusts transmission data rate. Similarly, CPU host 340 is connected to CXL retimer 330. CPU host 310 and CPU host 340 communicate with each other via their respective CXL retimers 320 and 330. It is to be appreciated that CXL retimer 320 and CXL retimer 330 are both compliant with the CXL standard, which allows for high data rates.

Figure 4:
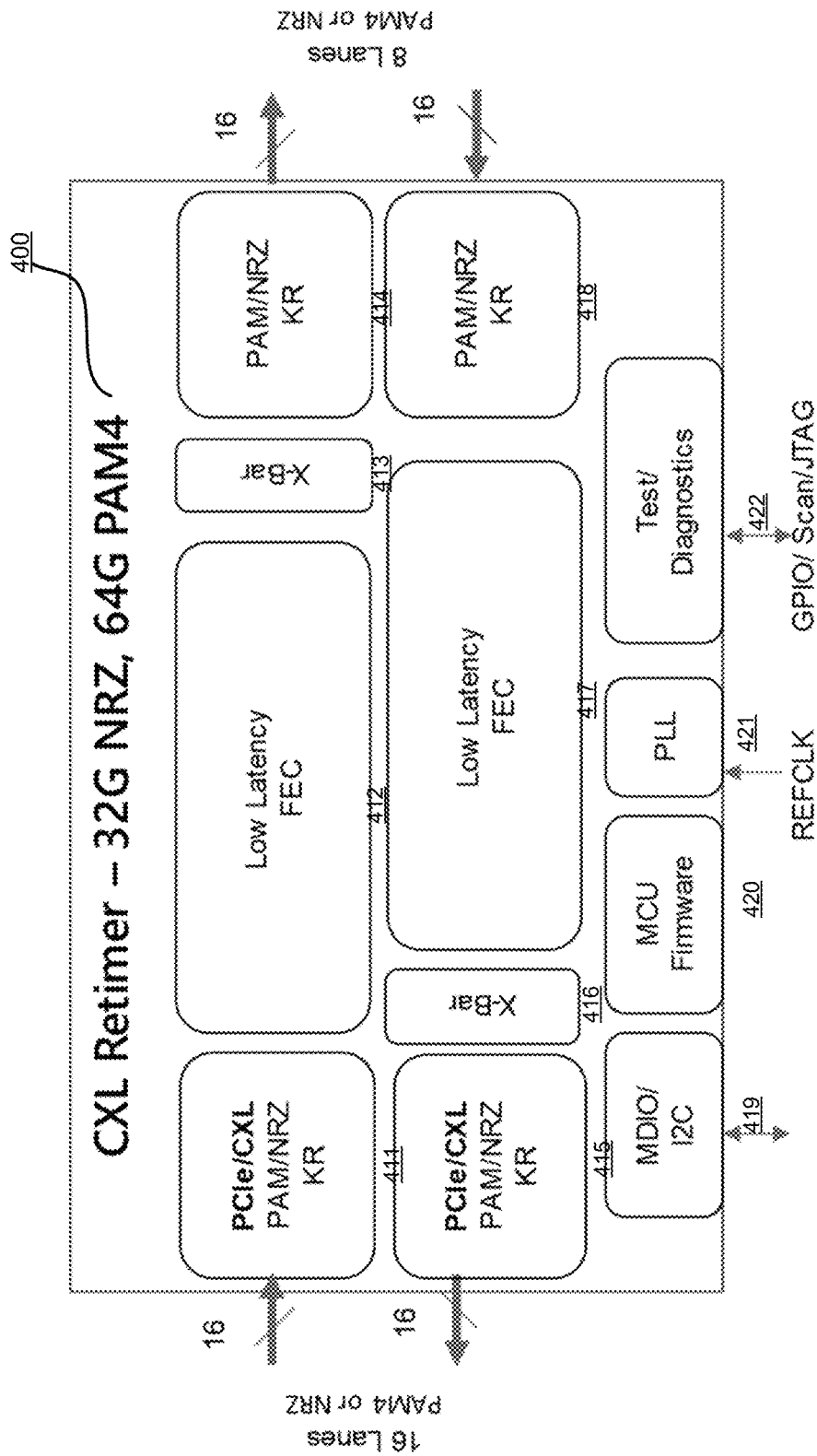
FIG. 4 is a simplified diagram illustrating a CXL retimer according embodiments of the present invention.

FIG. 4 is a simplified diagram illustrating a CXL retimer according embodiments of the present invention. This diagram is merely an example, which should not unduly limit the scope of the claims. One of ordinary skill in the art would recognize many variations, alternatives, and modifications. As an example, retimer 400 is configured to work with NRZ protocol and PAM4 protocol, which provide different data rates for different applications. For example, PCIe/CXL receiving interface 411 and transmitting interface 415 each provides 16 lanes communication lanes that can operate in PAM4 and NRZ formats. As an example, interfaces 411 and 415 are capable of low-latency and high-speed communication as demanded for retimer 400. The FEC modules 412 and 417 are specifically configured to performing decoding and encoding process at low-frequency (e.g., less than 50 nanoseconds). In various embodiments, in addition to low-latency operations, FEC modules 412 and 417 are configured to perform soft FEC (e.g., taking advantage of interleaved parity bits as described above) operations for additional coding gain.

Retimer 400 additionally includes PAM/NRZ interfaces 414 and 418 for, respectively, for transmitting and receiving data in PAM4 and NRZ formats. Retimer 400 additionally includes components such as management data I/O (MDIO) module 419, microcontroller unit (MCU) firmware module 420, phase-lock loop (PLL) 421, and test/diagnostics module 422. For example, PLL 421 is associated with processing clock signals. In various embodiment, module 420 may update the firmware stored therein to improve performance.

It is to be understood that while FIG. 4 shows retimer 400 operating with 16 or 8 communications, retimer 400 may be adapted to support multiple communication modes, such as 4 lane mode, 8 lane mode, and 16 mode, operating in bi-directional modes.

Figure 5:
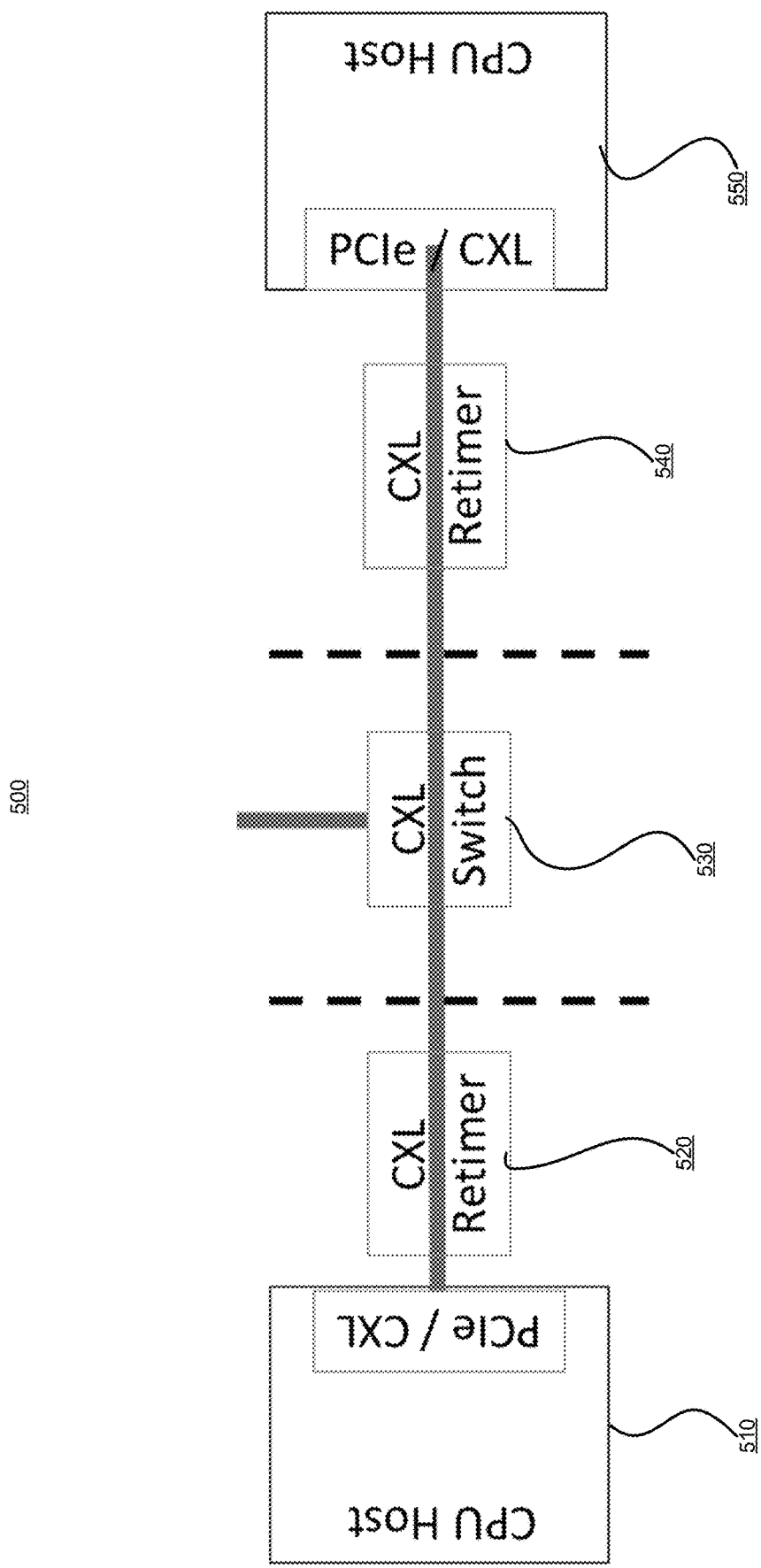
FIG. 5 is a simplified diagram illustrating communication configuration where retimers are connected via a CXL switch according to embodiments of the present invention.

FIG. 5 is a simplified diagram illustrating communication configuration where retimers are connected via a CXL switch according to embodiments of the present invention. This diagram is merely an example, which should not unduly limit the scope of the claims. One of ordinary skill in the art would recognize many variations, alternatives, and modifications. CPU host 510 is connected to CXL retimer 520, which adjusts transmission data rate. Similarly, CPU host 550 is connected to CXL retimer 540 that adjusts data rate. CPU host 510 and CPU host 550 communicate with each other via their respective CXL retimers 520 and 540. It is to be appreciated that CXL retimer 520 and CXL retimer 540 are both compliant with the CXL standard, which allows for high data rate. In contrast to FIG. 5, retimers 520 and 540 do not communicate directly with each other, but through CXL switch 530. For example, CXL switch 530 comprises, among other components, communication interfaces and switch fabric for managing data links. Additionally, CXL switch 530 is configured to operate with CXL protocols.

Figure 6:
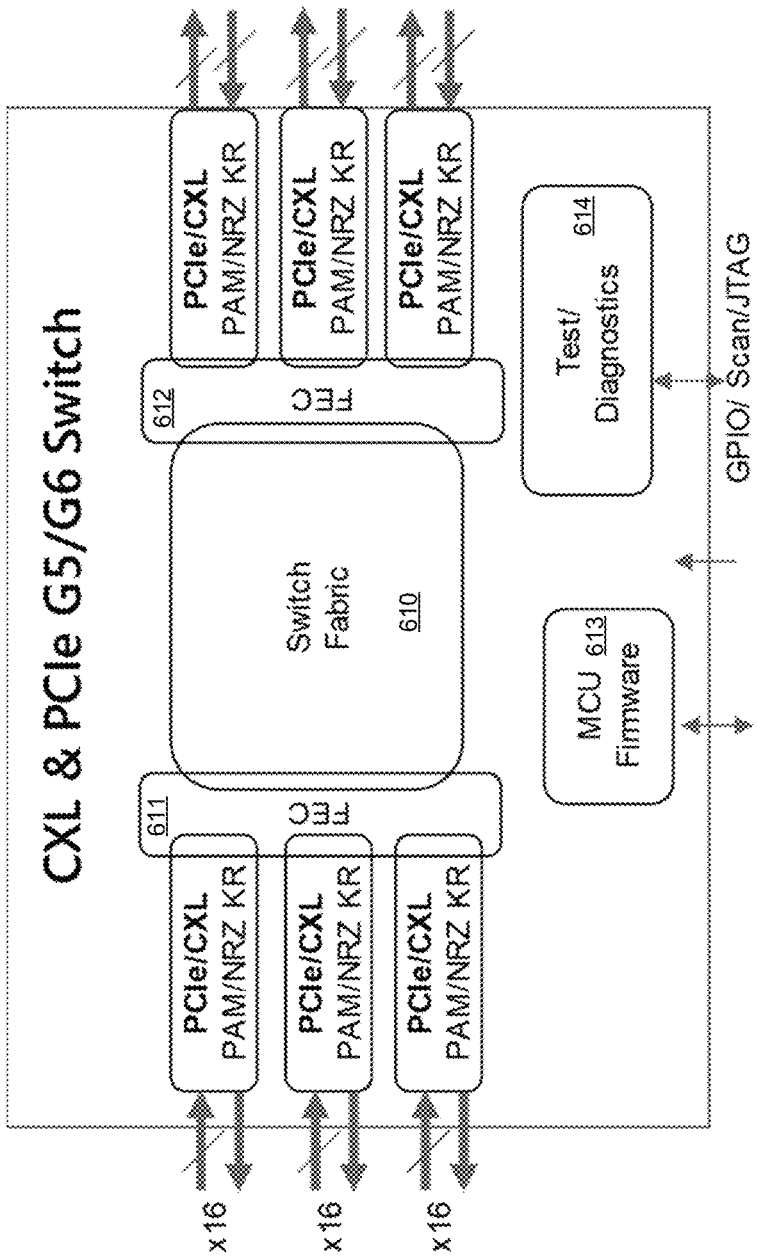
FIG. 6 is a simplified diagram illustrating CXL with according to embodiments of the present invention.

FIG. 6 is a simplified diagram illustrating CXL with according to embodiments of the present invention. This diagram is merely an example, which should not unduly limit the scope of the claims. One of ordinary skill in the art would recognize many variations, alternatives, and modifications. Switch 600 as shown is a CXL switch (e.g., CXL switch 530 in FIG. 5), which includes high-speed communication interfaces for connecting to retimers and/or other entities. Switch 600 includes FEC modules 611 and 612, which are configured to perform low-latency (e.g., lower than 50 nanoseconds) FEC encoding. In various embodiments, switch 600 is implemented with a high level of power efficiency (e.g., power consumption of less than 15 W). Switch 600 can be configured to provide a cut-through mode, which allows for ultra-low latency. For example, the FEC encoding performed by FEC modules 611 and 612 may include soft FEC encoding, as explained above). Switch 600 additionally includes MCU module 613 for managing communication and miscellaneous functionalities. The functionalities of MCU module 613, which affects the behavior of switch 600, can be modified by firmware update. For example, MCU module 613 includes nonvolatile memory for storing firmware. Switch 600 additionally includes test/diagnostic module 614. For example, module 614 tests and calibrates various operating parameters of switch 600.

Figure 7:
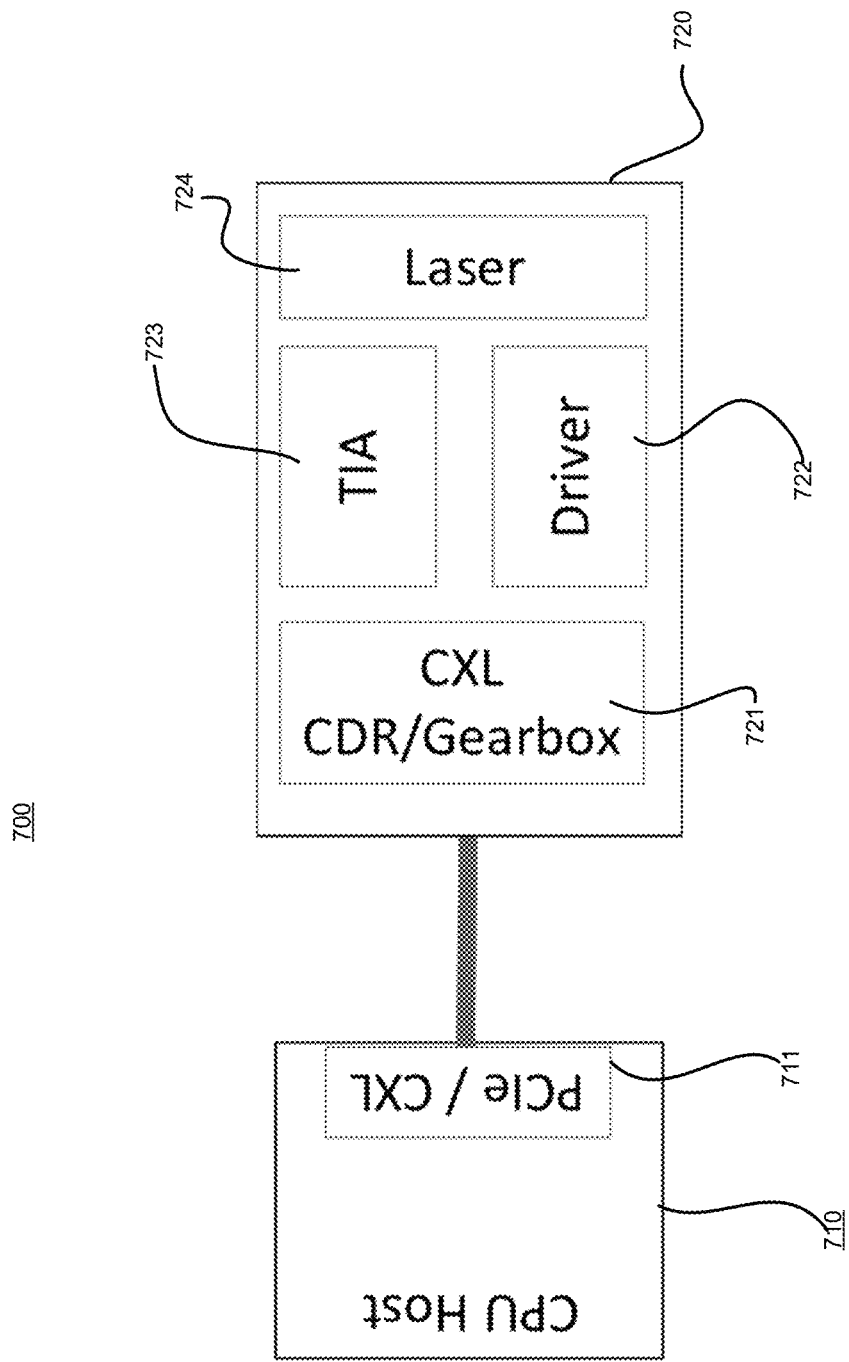
FIG. 7 is a simplified diagram illustrating an optical communication module according to embodiments of the present invention.

FIG. 7 is a simplified diagram illustrating an optical communication module according to embodiments of the present invention. This diagram is merely an example, which should not unduly limit the scope of the claims. One of ordinary skill in the art would recognize many variations, alternatives, and modifications. For example, optical module 720 in FIG. 7 can be used to implemented the optics module 260 in FIG. 2. CPU host 710 includes a PCIe/CXL interface 711 for sending data to optical module 720. For example, CPU host 710 transmits data at a very high speed, which is suitable for applications and tasks that require low latency and high bandwidth. For example, the communication link between CPU host 710 and module 720 is an electrical communication link at a high speed, and the module 720 is capable of optical transmitting data at an even higher speed.

Optical module 720 includes CXL gearbox 721 that changes data rate for transmission. For example, gearbox 721 is also coupled to other entities (e.g., accelerator 270 and memory 280 in FIG. 2), and it is configured to perform multiplexing to transmit data from different devices. Driver 727 uses multiplexed data from gearbox 721 to generate driver signal. For example, driver 727 includes MZM modulator to generate driving signal for optical modulation. Optical module 720 includes a transimpedance (TIA) module 723 for converting received optical signal (e.g., via an optical receiver not shown in FIG. 7) to electrical signal for processing. Additionally, optical module 720 includes laser 724 as the light source, using which optical signal is generated and transmitted.

Figure 8:
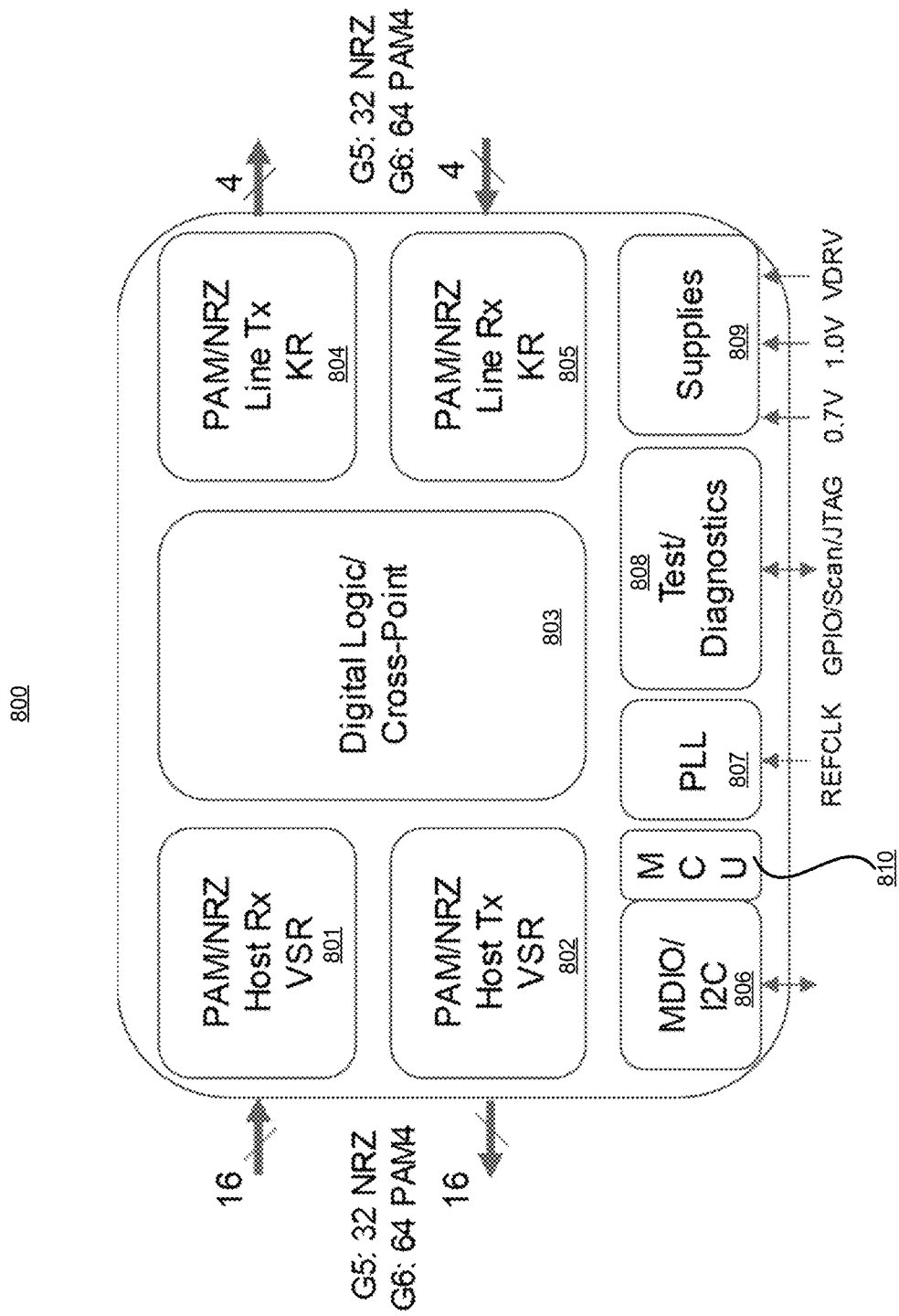
FIG. 8 is a simplified diagram illustrating a PAM4 module device according to embodiments of the present invention.

FIG. 8 is a simplified diagram illustrating a PAM4 module device according to embodiments of the present invention. This diagram is merely an example, which should not unduly limit the scope of the claims. One of ordinary skill in the art would recognize many variations, alternatives, and modifications. As an example, PAM4 module 800 performs various functionalities of gearbox 721 in FIG. 7. It is to be appreciated that PAM4 module 800 is optimized for high speed and low latency, and its application is suitable for interconnecting entities within a computational cluster, which communicates with one another within a very short reach (VSR). In various embodiments, the PAM4 module is configured to perform at a very low latency (e.g., less than 50 nanoseconds). For example, PAM4 module 800 is configured to be power efficient, operating at lower than 2 W. In various embodiments, PAM4 module 800 operates at different levels of power consumption (e.g., via multiple power mode schemes) depending on the amount of data it processes.

PAM4 module 800 includes host interfaces 801 and 802, which are respectively configured for receiving and transmitting data. For example, host interfaces 801 and 802 are each configured to operate up to 16 communication lanes, and they are able operate in other modes as well (e.g., 8 lanes, 4 lanes, 2 lanes and a single lane). Host interfaces 801 and 802 are configured to up convert NRZ data transmission (e.g., at 32G rate) to PAM4 data transmission (e.g., at 64G), and to down convert from PAM4 data to NRZ data. Similarly, line interfaces 804 and 805, respectively configured for transmitting and receiving data, are also configured to up convert NRZ data transmission (e.g., at 32G rate) to PAM4 data transmission (e.g., at 64G), and to down convert from PAM4 data to NRZ data. For example, PAM4 module 800 functioning as the gearbox, two lanes for NRZ data at 32G (e.g., PCIe G5) is converted to 64G PAM4 (e.g., PCIe G6) data that transmitted over a single PAM4 lane. In a way, module 800 also functions as a retimer. For example, two lanes of PCIe G5 (e.g., 32G NRZ) data are converted to PCIe C5 (e.g., 32G NRZ) data. As another example, PCIe G6 (e.g., 64 NRZ) data is converted to PCIe C5 (e.g., 32G NRZ) data.

Module 800 additionally includes a digital logic module 803 for multiplexing and data switching to allow data from different communication lanes to correctly routed. MDIO module 806 provides various input and output functionality. It is to be appreciated that MCU 810 may be programmed to perform various system and control functions. In an embodiment, MCU 810 comprises non-volatile storage that stores firmware that can be updated and reconfigured. Module 800 includes PLL 807 for clock signals. For example, PLL 807 generates reference clock signal based on the received data. Module 800 additionally includes a test/diagnostic module 808. For example, module 808 is determined to perform various diagnostics routines to ensure the proper functionalities of module 800. In various embodiments, module 808 runs calibrations to determine the optimal operating parameters for module 800. For example, module 808 determines the optimal data rate based on the quality of communication lanes. Module 800 receives supply voltage via module 809. For example, module 800 may operate at different voltage levels depending on the operation mode and the system implementation (e.g., difference systems may have different voltage supplies). In certain embodiments, supplies module 809 provides power regulation functions.

Figure 9:
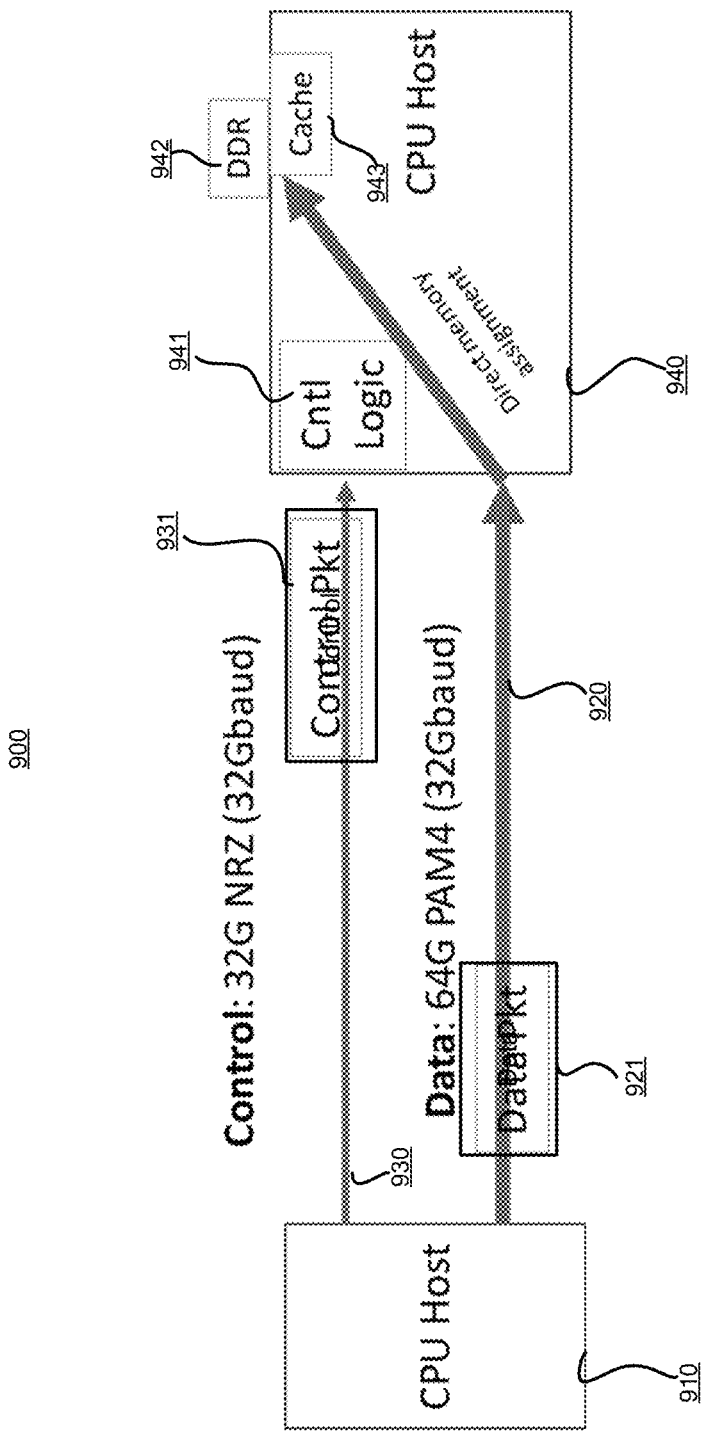
FIG. 9 is simplified diagram illustrating a switch utilizing both NRZ and PAM protocols according to embodiments of the present invention.

FIG. 9 is simplified diagram illustrating a switch utilizing both NRZ and PAM protocols according to embodiments of the present invention. This diagram is merely an example, which should not unduly limit the scope of the claims. One of ordinary skill in the art would recognize many variations, alternatives, and modifications. There are two communication lanes between CPU host 910 and CPU host 940. Communication lane 930 is configured for NRZ (e.g., 32G) transmission. Communication lane 920 is configured for PAM4 (e.g., 64G) communication. It is to be appreciated that PAM4 protocol offers higher data rate than NRZ protocol, PAM4 protocol involves a higher latency (e.g., due to transmission delay at higher data rate) than that of NRZ protocol. For example, control data packet 831 is generally smaller than data packet 921. Control data packet 831 is transmitted over communication lane 930, and it arrives earlier than data packet 921. CPU host 940 uses the information provided by control data packet 831 to set various parameters of control logic 941. For example, control data packet 831 may include information associated with communication protocol, data transmission mode, etc. In a specific embodiment, control data packet 831 includes power control information associated with PAM4 data communication. Control data packet 831 may additionally include out of band error correction code. Data packet 921 is transmitted over communication lane 920 at a high data rate. In various embodiments, CPU host 940 is configured with direct memory assignment (e.g., pursuant to CXL protocol) and writes data directly to cache 943 and/or memory 942.

It is to be appreciated that there various implementations of communication and computational systems according to embodiments of the present invention. In an embodiment, the present invention provides a computer server apparatus that includes a central processing unit device comprising a PCIe block and a CXL block. For example, the computer server apparatus is illustrated in FIG. 2. As an example, the CXL block is configured for a dynamic multi-protocol process, which is selected from a look-up table including a cache process, a memory process, or an I/O process. The apparatus includes a high speed communication link, which is configured in a PAM4 modulation format. The communication link is characterized by a high gain of greater than a 3 dB coding gain and less than 20 dB and a low latency FEC of about 20 to 300 nanoseconds. The communication link connects the central processing unit to other entities of the apparatus. In a specific embodiment, the high speed communication is at a rate of 16 Gigabit per second to 256 Gigabit per second.

The apparatus also includes a retimer device coupled to the high speed communication link. The apparatus also includes a plurality of processing devices coupled to the high speed communication link to communicate to the central processing unit device. For example, the plurality of processing devices include accelerators 270 as shown in FIG. 2. As an example, wherein the plurality of processing devices is one of a processing device, a digital signal processing device, and an artificial intelligence processing device.

The apparatus also includes a plurality of memory devices coupled to the high speed communication link. For example, memory devices include memory 280 shown in FIG. 2. For example, the plurality of memory devices is one of a dynamic random access memory device, a static random access memory device, a Flash memory device, a fixed memory device, or other non-volatile memory device.

The apparatus also includes a network interface device coupled to the high speed communication link. For high speed data transmission, PAM4 protocol may be employed. In various embodiments, the apparatus includes a PAM4 module, which includes a transmit device, a receiver device, a management device, and a FEC device. For example, the PAM4 module is configured to receive an incoming PAM4 signal using the receiver device, and to transmit an outgoing PAM4 signal using the transmit device.

In various embodiments, clusters of devices as provided as a semiconductor integrated circuit device, which includes a semiconductor substrate. The device also includes a plurality of transmit devices and a plurality of receive devices. The device includes a bus device that includes a transmit device and a receive device. For example, he bus device is coupled to a management device and an FEC device. The device further includes a switch device between configured between each of the plurality of transmit devices and each of the receive devices.

Various communication and computation needs can be performed by a server apparatus according to embodiments of the present invention. For example, a server apparatus includes an optical ring device and a plurality of processing devices coupled to the optical ring device. Each of the processing devices is coupled to a silicon photonics device. The silicon photonics device is coupled to the optical ring device. For example, the optical ring device is illustrated in FIG. 1. The server apparatus also includes a plurality of memory devices coupled to the optical ring device. Each of the memory devices is coupled to a silicon photonics device. For example, the memory devices are coupled to the optical ring device via the silicon photonic device.

Various computer server apparatus may be implemented according to the present invention. In an embodiment, the present invention provides a computer server apparatus that includes a central processing unit device comprising a PCIe block and a CXL block. In a specific embodiment, the CXL block is configured for a dynamic multi-protocol process, which is selected from a look-up table including a cache process, a memory process, or an I/O process. The device also includes an optical communication link that is configured in a PAM4 modulation format. For example, the optical communication link is at a rate of 16 Gigabit per second to 256 Gigabit per second and is configured in a wave division multiplexing format.

The device additionally includes a plurality of processing devices coupled to the optical communication link to communicate to the central processing unit device. In various embodiments, the plurality of processing devices is one of a processing device, a digital signal processing device, and an artificial intelligence processing device. Each of the processing devices is coupled to a silicon photonics device coupled to the optical communication link. The device further includes a plurality of memory devices coupled to the optical communication link. For example, the plurality of memory devices is one of a dynamic random access memory device, a static random access memory device, a Flash memory device, a fixed memory device, or other non-volatile memory device. Each of the memory devices is coupled to a silicon photonics device coupled to the optical communication link.

The computer server apparatus may additionally include a PAM4 module, which includes a transmit device, a receiver device, a management device, and a FEC device. The PAM4 module is configured to receive an incoming PAM4 signal using the receiver device, and to transmit an outgoing PAM4 signal using the transmit device.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An optical module, comprising:
    first circuitry configured to (i) receive first data transmitted from a host device over an electrical communication link at a first data rate, the first data transmitted from the host device, the first data including peripheral component interconnect express (PCIe) data and compute express link (CXL) data, (ii) change a data rate for transmission of the first data from the optical module, and (iii) transmit the first data from the optical module at a second data rate that is different than the first data rate; and
    second circuitry configured to (i) convert the first data transmitted from the host device at the first data rate from an electrical format to an optical format for transmission from the optical module at the second data rate and (ii) convert second data received from an optical receiver at the second data rate from the optical format to the electrical format for transmission from the optical module to the host device at the first data rate via the first circuitry.

2. The optical module of claim 1, wherein the first circuitry is configured to multiplex the first data received from the host device and third data received from one or more other devices for transmission from the optical module.

3. The optical module of claim 1, wherein the second circuitry comprises a driver configured to generate a driving signal to modulate the first data received by the first circuitry into the optical format.

4. The optical module of claim 1, wherein the second circuitry comprises transimpedance circuitry configured to convert the second data from the optical format to the electrical format.

5. The optical module of claim 1, wherein the second circuitry comprises a light source configured to generate the first data in the optical format for transmission from the optical module.

6. The optical module of claim 1, further comprising a pulse amplitude modulation (PAM) circuit configured to modulate either one of the PCIe data and the CXL data into a PAM format for transmission from the optical module.

7. The optical module of claim 6, wherein the PAM circuit comprises the first circuitry.

8. The optical module of claim 1, wherein the second circuitry is configured to convert the first data received from the host device from a non-return to zero (NRZ) format to a pulse amplitude modulation format and convert the second data from the PAM format to the NRZ format.

9. A system for transmitting and receiving data, the system comprising:
    the optical module of claim 1; and
    the host device.

10. The system of claim 9, wherein the host device is a host processor configured to transmit the first data transmitted from the host device to the optical module and receive the second data from the optical module.

11. The system of claim 10, further comprising at least one of a memory device, a processing device, and a network interface coupled to the optical module,
    wherein the first circuitry is configured to multiplex the first data received from the host device and third data received from the at least one of the memory device, the processing device, and the network interface.

12. The system of claim 11, wherein the processing device is one of a digital signal processing device and an artificial intelligence processing device.

13. The system of claim 11, wherein the memory device comprises non-volatile memory.

14. The system of claim 13, wherein the non-volatile memory comprises one of dynamic random access memory, static random access memory, and flash memory.

15. The system of claim 13, wherein the first circuitry is configured to receive the first data transmitted from the host device over a single channel of the electrical communication link.

16. The system of claim 15, wherein the second circuitry is configured to convert the second data received from the optical receiver at the second data rate from the optical format to the electrical format for transmission from the optical module to the host device over the single channel.

17. The optical module of claim 1, wherein:
    the first circuitry is configured to receive the first data transmitted from the host device over first number of channels of the electrical communication link; and
    transmit the first data from the optical module over a second number of channels, the second number of channels being equal to the first number of channels.

18. The optical module of claim 1, wherein the first circuitry is configured to receive third data from a switch over a second channel and to change a data rate of the third data received from the switch to the second data rate for transmission from the optical module.

19. The optical module of claim 18, wherein the first circuitry is configured to receive a first type of data from the host device and to receive a second type of data from the switch, the second type of the data being different than the first type of the data, the first data being of the first type, and the third data being of the second type.

20. The optical module of claim 18, wherein the first circuitry is configured to receive the first data transmitted from the host device in a non-return to zero format, and to receive the third data from the switch in a pulse amplitude modulation format.

21. The optical module of claim 18, wherein the first circuitry is configured to multiplex the first data received from the host device with the third data received from the switch to provide multiplexed data for transmission by the optical module.

22. The optical module of claim 1, wherein the first circuitry is configured to transmit the first data from the optical module over an optical communication link at an overall data rate that is different than an overall data rate of the electrical communication link, the overall data rate of the optical communication link being the second data rate, and the overall data rate of the electrical communication link being the first data rate.

* * * * *